United States Patent [19]

Momose

[11] Patent Number: 4,597,108

[45] Date of Patent: Jul. 1, 1986

[54] POWDERFREE SURGICAL GLOVES

[76] Inventor: Akira Momose, 1-100 Umeda, Kiryu, Guna, Japan, 376-06

[21] Appl. No.: 675,896

[22] Filed: Nov. 28, 1984

[51] Int. Cl.$^4$ .............................................. A41D 19/00
[52] U.S. Cl. .......................................... 2/168; 2/167; 427/204
[58] Field of Search ............... 2/168, 169, 167, 161 R; 427/204

[56] References Cited

U.S. PATENT DOCUMENTS

| | | | |
|---|---|---|---|
| 3,411,982 | 11/1968 | Kavalir et al. ...................... | 2/168 X |
| 3,740,262 | 6/1973 | Agostinelli .......................... | 2/168 X |
| 3,856,561 | 12/1974 | Esemplare et al. .................. | 2/168 X |
| 3,967,014 | 6/1976 | Esemplare et al. .................. | 2/168 X |
| 3,992,221 | 11/1976 | Homsy et al. ....................... | 2/168 X |
| 4,027,060 | 5/1977 | Esemplare et al. .................. | 2/168 X |
| 4,082,862 | 4/1978 | Esemplare et al. .................. | 2/168 X |
| 4,304,008 | 12/1981 | Joung ..................................... | 2/167 |

Primary Examiner—Werner H. Schroeder
Assistant Examiner—Judith L. Olds
Attorney, Agent, or Firm—Singer & Singer

[57] ABSTRACT

A latex article such as a glove or girdle having a halogenated outside surface to a first degree and a halogenated inside surface to a second degree thereby providing different slippery coefficient surfaces on the outside and the inside of the article without the need of powders, resins or exterior finishes.

5 Claims, 1 Drawing Figure

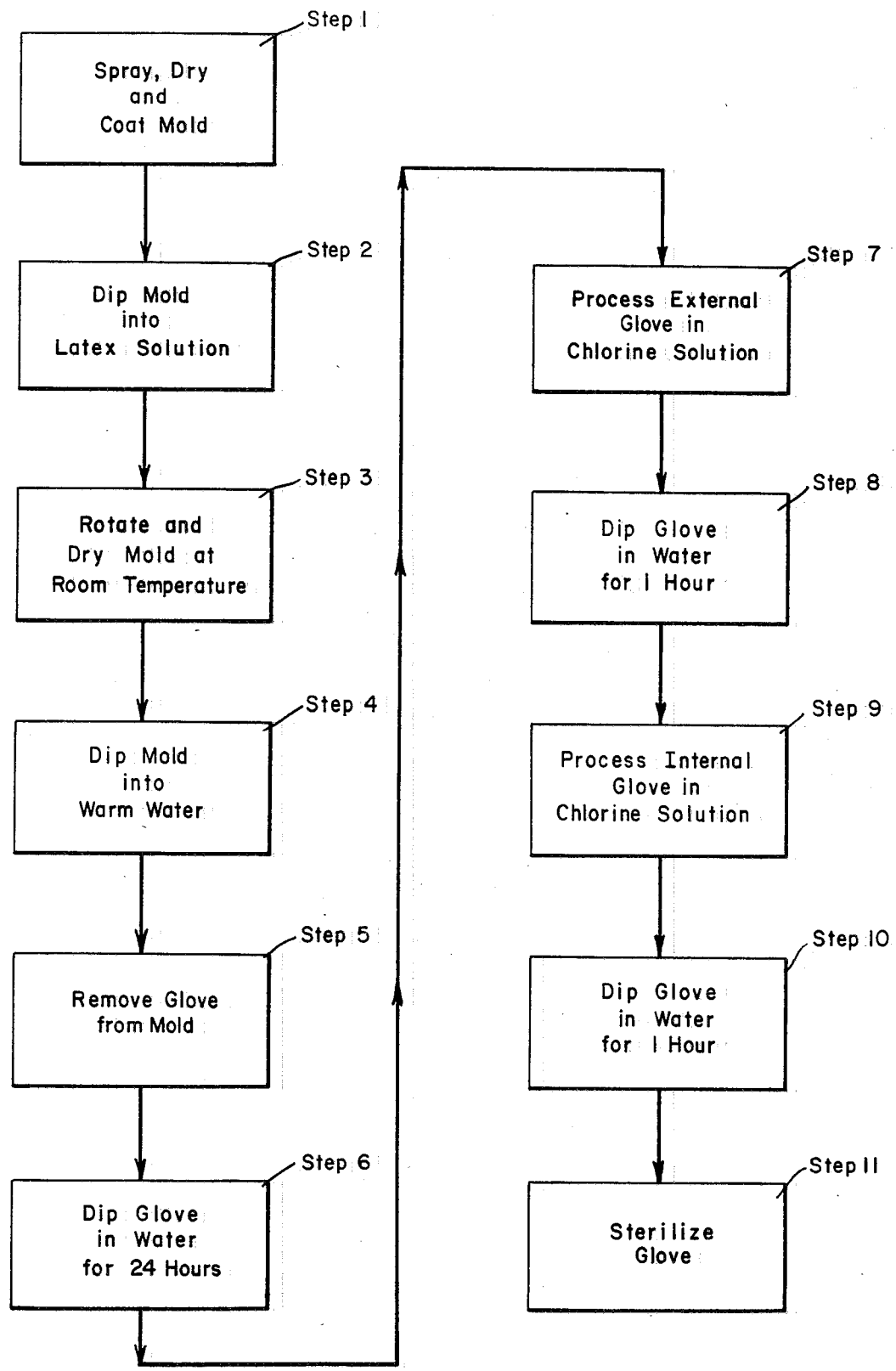

POWDERFREE SURGICAL GLOVES

This invention relates primarily to a natural rubber glove used by surgeons in which the inside surface and the exterior surface of the glove are halogenated to different degrees to thereby provide different degrees of slipperiness and without the need of powders or external finishes.

The prior art relating to surgeon's gloves have recognized the need for producing a glove having an external surface having a certain frictional coefficient that provides a measure of control by the surgeon over instruments and tools that are picked up and handled during the operative procedures.

In the prior art it has long been recognized that natural rubber in the form of pure latex produced the best glove for the surgeon with regard to comfort and feel. Unfortunately the natural latex rubber provided additional problems for the surgeon in inserting his hand into the glove due to the tendency of the glove to stick to the hand which resulted in friction and bunching of the glove on the surgeon's hand during the insertion process. This process complicated the procedure, necessitating the need for external help and compromised the sterileness and cleanliness of the glove when finally inserted on the hand of the surgeon.

The prior art recognized these problems and suggested the use of powders of different kinds such as talcum powder, corn starch and other proprietary powders that have the effect of lubricating the inside of the glove thereby making the insertion of the surgeon's hand easier and capable of being performed by a single person without the undesirable side effects mentioned above.

Unfortunately the use of lubricating powder to dust the glove could not be limited to the inside of the glove as the glove is folded during the insertion process which has the effect of contaminating the outside of the glove with the lubricating powder.

Recent experimentations have shown that the different lubricating powders used on surgical gloves have a deleterious effect in that contamination of the patient is possible and in many cases serious side effects have occurred which have been proven to be the result of contamination caused by the lubricating powders used by the surgeon.

The problems associated with contamination resulting from corn starch, powder and the like have been commented upon in an article entitled Powderfree Surgical Gloves by Villasenor, Harris, Barron, Krasnow and Salz appearing in a magazine entitled Ophthalmic Surgery printed by the Estelle Doheny Eye Foundation, University of Southern California School of Medicine, Los Angeles, Calif.

The article is cited primarily for its extensive bibliography concerning the contamination resulting from lubricating powders used on surgical gloves.

The prior art recognized these problems and attempted to solve the problem by making both the outside of the glove and the inside of the glove more slippery by means of a halogenation process. These processes were successful in varying degrees except that the halogenation proces had the unfortunate side effect of making the inside of the glove very slippery, causing the glove to be very unstable on the hands of the surgeon. Additionally, the outside of the glove then became so slippery as to prevent the surgeon from successfully holding the tools needed during the operating procedures.

The prior art attempted to overcome these difficulties by means of controlled halogenation on the external surfaces of the glove and the use of powder on the inside of the glove for lubrication purposes. In addition, other techniques of creating an external slip surface which was deposited on the outside of the glove as an external finish have been disclosed to create the desired surface frictions, required by the surgeons.

A review of the art shows that U.S. Pat. No. 3,411,982 entitled "Elastomeric Article Having A Slip Coating" by J. J. Kavalir, et al, discloses the process of halogenating the surface of the rubber glove with a bromine or chlorine to make slippery. The Kavalir patent is disclosed primarily to show other solutions of utilizing a halogenation process in developing slip coatings to achieve the desired slipperiness of the external surface of the glove.

U.S. Pat. No. 3,740,262 entitled "Dual Finish Surgeon's Glove and Method of Making Same" issued to A. J. Agostinelli, also teaches the treatment of a surface of a surgeon's glove with any halogen and preferably chlorine or bromine.

Interestingly, the Agostinelli recognizes that treating the inside of the glove with the halogenation process makes the glove too slippery and hence unacceptable and, here again, he discloses the use of suitable lubricating powders to solve the insertion process. The patent is interesting for the complete disclosure of the problems associated with utilizing a surgeon's glove and he does disclose many procedures for minimizing the effect of the powder used to minimize the contamination of the powder on the patient.

U.S. Pat. No. 3,967,014 entitled "Rubber Articles Having Improved Slip Coating" issued to P. E. Esemplare, et al, also discloses the concept of using a slip coating on the external surface of the rubber glove as a means of controlling the slipperiness on the outside surface of the glove. This patent is cited to show the development of the art in minimizing the use of lubricating powders on surgical gloves.

U.S. Pat. No. 3,992,221 entitled "Method of Treating Extensible Hydrocarbon Articles" issued to Homsy, et al, discloses a preferred method of halogenating the outside surface of a surgeon's glove. This patent discloses certain advantages of utilizing chlorine gas during the halogenation process as opposed to fluorine or other halogenation gases.

Homsy does show and describe a glove treated on one surface to make it slippery enough that powder is not needed. Homsy does not treat the other surface but, interestingly, he does disclose the concept of controlled treating to obtain a degree of external slipperiness that eliminates the need for powder. Homsy discloses only the treating of the outside surface of the glove.

In the present invention there is described a preferred method and apparatus for producing a surgeon's glove from pure latex rubber that is treated on both the external surface and on the internal surface and in different degrees to thereby obtain the desired internal friction which is different from the friction obtained on the outside surface. By controlling the halogenation process to obtain differential degrees of slipperiness, it is now possible to produce a glove having the desired slipperiness to insert the surgeon's hands without difficulty and the desired external friction that enhances the surgeon's ability to handle the necessary tools and equipment of his trade.

In the practice of the present invention it has been discovered that the inventive concept is achieved by establishing a range of settings for concentration, temperature and time.

The procedure includes dipping the rubber gloves in a chlorinated water solution at a concentration ranging from 45,000 ppm to 60,000 ppm at temperatures ranging from 18 degrees Centigrade to 25 degrees Centigrade and for periods of time ranging from 70 seconds to 220 seconds.

More specifically, the process includes dipping the outside surface of the rubber gloves for a period of time ranging from 70 seconds to 110 seconds and dipping the inside surface of the gloves from 150 seconds to 220 seconds.

In the commercial preparation of the rubber gloves prepared according to the present invention, tests have been carried out at 50,000 ppm concentrations at 20 degrees Centigrade and for 90 seconds for the outside surface and at 180 seconds for the inside surface. The difference in the time period resulted in a smoother inside surface thereby making it easy to insert the fingers in the gloves and also achieved a harder outside surface making it easier for the surgeon to hold the medical instruments.

Further objects and advantages of the present invention will be made more apparent by referring to the attached drawing which illustrates a flow sheet illustrating the preferred method for processing both the inside surface and the external surface of the glove.

Rubber surgical gloves have been in use for nearly 100 years beginning near the end of the last century. The gloves have a three-fold purpose, first, to prevent the contamination of the area of the surgery from the germs of bacteria that remain on the fingers of the surgeon, secondly, the gloves protect the surgeon from the infection of germs located in the patient and, thirdly, the gloves protect the skin of the surgeon from any inflamations that could be caused by the medicines and drugs being used during the surgery itself.

The materials used in the manufacture of surgical gloves have included natural rubber and vinyl chloride. Natural rubber has good stretchability, adheres closely to the fingers, and has good tactile feeling during wearing. Unfortunately, inserting the fingers into natural rubbers is very difficult due to the adhesiveness of the surface of the gloves.

Vinyl chloride gloves on the other hand have many problem areas in that they are not stretchable, do not adhere closely to the skin, and have very inferior tactile feelings.

As a result of these considerations and the desires of the surgeons themselves, various kinds of powders have been added to the surface of rubber surgical gloves to make them slippery and easy to use. Common talc (magnesium silicate), corn starch powder and other powders have been primarily used as well as sodium bicarbonate, potassium bitartaric acid, calcium stearic acid, powder from plants such as licopodium powder, fatty acids, magnesium oxide, mica and other substances have been used and suggested.

Unfortunately, all of the above substances mentioned cause harm and damage to the human body. For example, talc adheres to the surgical wounds and causes granuloma sarcoma to the human tissue, and for this reason talc is not good for the healing of wounds. It has also been discovered that powder causes the festering of wounds, peritonitis, anal fistula, intestinal obstruction, meningitis, scarring of brain tissue, and inflammation of the nervous system, just to mention some of the disadvantages.

Recent discovery also indicates that powder may even have caused the death of some patients.

Corn starch, on the other hand, is not as violent as talc but does create other problems by causing allergic reactions and possibly serving as a carrier for infections bacteria and germs.

There seems to be no question in the minds of the experts of today that powder on surgical gloves is objectionable. Many surgeons, however, think that it is sufficient to wash the outside surface of the gloves with sterlized water after putting on the surgical gloves, believing that such action removes all powder and talc. Unfortunately, studies verified by Dr. Richard A. Villasenor show that even after the surgical gloves have been washed three or more times in water that examination of the gloves with an optical microscope or a scanning electron microscope reveals that there are still numerous particles of talc powder remaining on the outside surface of the gloves and adhering to the surface. In other words, it is not possible to completely remove all the powder by simply washing the gloves with water.

In addition, it has been discovered that by utilizing powder on the inside of the gloves to facilitate the use of the glove, that powder from the inside of the glove may spill out from the cuffs of the gloves and contaminate the area of the surgery. In addition, the gloves are sometimes torn while being used and powder from the inside does spill out causing infection and contamination as mentioned above. Last but not least, there is always the problem of determining whether sterilized water used to wash the gloves is truly in fact sterilized.

The present invention is concerned primarily and uniquely with the production of a surgical natural rubber glove that completely and once and for all eliminates the need for powders of any kind.

In the practice of the present invention halogenation, and preferably with clorine, is used to selectively treat the outside of the natural rubber glove to make the outside surface slippery to a desired degree.

The inside surface of the glove is also treated with chlorine but to a different degree in order to allow a certain amount of slipperiness that facilitates the use of the glove and makes it easy for the surgeon to insert his hand but at the same time is not so slippery that the glove is free to move on the surgeon's hand, thus losing that certain degree of cohesiveness that is so necessary to the feel of the surgeon in operating his instruments.

In other words, the outside surface of the natural latex rubber glove is treated with chlorine during the halogenation process and the internal surface of the glove is treated with chlorine during the halogenation process but at a different degree so as to obtain a different degree of slipperiness between the outside and inside surfaces.

It is thus possible to have a halogenated latex rubber glove that preserves the external tactile feeling needed by the surgeon together with the ease of use that makes it convenient for the surgeon to insert his hand in the glove and without the need of powder of any kind.

In the practice of the present invention the outside surface of the glove is treated with less chlorine and the inside surface with more chlorine when manufacturing the glove in order that the fingers may be inserted easily into the gloves while the surgical instruments may be held firmly.

In the manufacture of the glove a mold is chosen that fits the shape of the surgeon's hand and the glove is made with both the back of the hand and the palm of the hand accentuated thereby allowing the glove to respond freely with the bending of the fingers during use.

The main invention covers the method of manufacturing the surgical gloves by dipping natural rubber gloves in a solution of chlorinated water at concentrations ranging from 45,000 ppm to 60,000 ppm and at temperatures ranging from 18 degrees Centigrade to 25 degrees Centigrade for periods of time ranging from 70 seconds to 220 seconds.

In the treatment of gloves made according to the present invention, the outside surface of the glove is dipped for 70 seconds to 110 seconds while the inside surface of the glove is dipped for 150 seconds to 220 seconds.

Referring now to the accompanying drawing which illustrates a flow diagram, there will be described in more detail an example of an actual test conducted on the method of manufacturing surgical gloves treated with chlorine based upon the teachings of the present invention and in which the individual steps have been identified in the accompanying drawing.

Referring now to the accompanying drawing there is shown a flow diagram comprising a plurality of steps for processing latex rubber gloves according to the teachings of the present invention to produce a halogenated outside surface that is different from the halogenated inside surface.

STEP 1

When making surgical gloves from regular natural rubber (latex) a mold release agent made from calcium nitrate or calcium chloride is sprayed over the hand shaped mold made from a ceramic material. This solution is then dried on the mold. This step is necessary to allow the natural rubber gloves to be peeled off the hand shaped mold.

STEP 2

The hand shaped mold is dipped in a solution containing 40% pure rubber (latex). A very small amount of amonium chloride is added to this natural rubber solution to act as a stabilizer.

STEP 3

The hand shaped mold is pulled out of the natural rubber solution and the mold is turned over many times in order to produce a uniform thickness of the rubber. The gloves are then placed in a stationary position with the fingers pointed upwards. This is done for the purpose of making the finger portions of the glove relatively thin on the order of 200 microns ±5% while the back side of the palm portion of the glove is relatively thick. The gloves are then dried in this position.

STEP 4

The natural rubber adheres to the hand shaped mold and after the rubber gloves are dried the hand shaped mold is dipped into warm water.

STEP 5

The natural rubber becomes slightly soft from the warm water which then allows the gloves to be peeled off the mold.

STEP 6

The gloves are again dipped in water and washed with water for the purpose of removing the calcium nitrate or calcium chloride that was used as set forth in Step 1.

STEP 7

The gloves are dipped in a water solution containing chloride and the outside surface is halogenated. This treatment is the most important process in the manufacture of powder free gloves.

Based upon the density of the chloride, the time period for the treatment and the temperature, the halogenation of the outside surface of the gloves produces a remarkably different product.

One method of producing the chlorinated water solution comprises the method of injecting chlorine gas directly into the water and mixed into the chlorinated solution.

Another method comprises high density bleaching powder (60% effective chloride) and aluminum chloride may be mixed together in the water and made into a solution.

A third method comprises a solution created by electrolyzing a salt solution.

In the preferred embodiment a solution was created by mixing high density bleaching powder and aluminum chloride in water to thereby form the solution.

In the preferred embodiment the outside surface is treated in a 50,000 ppm chlorinated water solution for 1.5 minutes at 20 degrees Centigrade.

STEP 8

The gloves are washed in water one more time for approximately one hour to remove the chlorine residue.

STEP 9

For the purpose of making it easy to insert the fingers into the gloves, the gloves are turned inside out and the inside surface of the glove is dipped in a chlorinated water solution having a 50,000 ppm concentration at 20 degrees Centigrade temperature for approximately three minutes, and in this way the right amount of smoothness is achieved.

In both Steps 7 and 9 the density of the chloride is tested by hypochlorous acid litmus test paper (used to detect residue of high density chlorine) or by the D.P.D. method. In addition, in the treatment with chlorine the treatment tanks are sealed tight to prevent the vaporization of the chlorine gas and in this way the density of the chlorine is maintained at a constant level.

STEP 10

The gloves are again washed in water one more time for approximately one hour to remove all chlorine residue.

STEP 11

The gloves are dried and then sterilized, preferably with ethylene oxide gas (ETO).

There are other modifications of the method that may be used in chlorinating the inside surface at a different rate than chlorinating the outside surface.

For example, in Step 7 an alternate method includes the step of processing both the inside surface and the outside surface in a 50,000 ppm concentration for 1 ½ minutes at 20 degrees Centigrade temperature.

In the next step the gloves are turned inside out and the inside surface is again treated in 50,000 ppm concentrated liquid for 1 ½ minutes at 20 degrees Centigrade temperature. In this manner the inside surface is effectively treated for three minutes while the outside surface is treated for only 1 ½ minutes.

The next step is the same as Step 10 which includes dipping the glove in water for one hour to remove all residue of chlorine followed by Step 11 which is to sterilize the glove.

While the inventive methods for producing the new glove have been described in connection with the preferred embodiment, it has been discovered that satisfactory results are obtained by subjecting the outside surface of the glove to a 50,000 ppm concentration at 20 degrees Centigrade temperature for a period of time ranging from 70 seconds to 110 seconds.

The inside surface has produced satisfactory results by subjecting the inside surface to a 50,000 ppm concentration at 20 degrees Centigrade temperature for a time ranging from 150 seconds to 220 seconds.

Natural rubber surgical gloves produced by the method described allow the surgeon to more easily insert his hand into the glove while at the same time produces a glove that has the tactile feel necessary to precisely hold and control the surgical instruments.

I claim:

1. A method of producing natural rubber surgical gloves comprising the steps of halogenating both the outside surface and the inside surface of the gloves for different time periods.

2. A method according to claim 1 in which the inside surface is halogenated for a period of time that is twice as long as the time used to halogenate the outside surface.

3. A method according to claim 1 in which the outside surface is halogenated for a time period ranging from 70 seconds to 110 seconds in a 50,000 ppm concentration at substantially 20 degrees Centigrade temperature.

4. A method according to claim 1 in which the inside surface is halogenated for a period of time over a range of 150 seconds to 220 seconds in a concentration of approximately 50,000 ppm held at a temperature of approximately 20 degrees Centigrade.

5. A natural rubber surgical glove comprising a halogenated outside surface and a halogenated inside surface and in which the halogenated outside surface is different from said halogenated inside surface.

* * * * *